United States Patent [19]

Yeager

[11] Patent Number: 4,824,631

[45] Date of Patent: Apr. 25, 1989

[54] METHOD OF MANUFACTURING A CONTOURED ELASTOMERIC PAD

[75] Inventor: James F. Yeager, Renton, Wash.

[73] Assignee: The Boeing Company, Seattle, Wash.

[21] Appl. No.: 55,243

[22] Filed: May 28, 1987

[51] Int. Cl.⁴ .................. B29C 43/12; B29C 65/70
[52] U.S. Cl. .................... 264/552; 264/102; 264/152; 264/155; 264/36; 264/261; 264/220; 264/308; 264/313; 264/554; 156/264
[58] Field of Search .............. 156/245, 264, 265, 242, 156/297, 251; 264/320, 313, 102, 152, 257, 36, 219, 220, 225, 226, 227, 236, 347, 261, 510, 511, 512, 155, 552, 308, 554; 249/112, 134; 425/501, 503, 504, 389

[56] References Cited

U.S. PATENT DOCUMENTS

| | | | |
|---|---|---|---|
| 2,290,640 | 7/1942 | Hubbard | 264/152 |
| 2,297,204 | 9/1942 | Deissner | 264/152 |
| 2,313,508 | 3/1943 | Carman | 156/266 |
| 2,568,292 | 9/1951 | Murray | 264/152 |
| 3,165,569 | 1/1965 | Bright | 264/313 |
| 3,308,223 | 3/1967 | Hoppes | 264/152 |
| 3,773,598 | 11/1973 | Taeffner | 156/266 |
| 3,795,559 | 3/1974 | Horn et al. | 264/313 |
| 3,860,470 | 1/1975 | Jaisle et al. | 264/220 |
| 3,883,627 | 5/1975 | Fitts | 264/220 |
| 4,219,601 | 8/1980 | Inoue | 156/266 |
| 4,352,843 | 10/1982 | Eckert | 156/266 |
| 4,401,496 | 8/1983 | Koontz | 156/264 |
| 4,405,539 | 9/1983 | Schulte | 264/152 |
| 4,435,242 | 3/1984 | McNulty | 156/264 |
| 4,456,496 | 6/1984 | Suter | 156/266 |
| 4,554,036 | 11/1985 | Newson | 264/36 |
| 4,620,890 | 11/1986 | Meyers et al. | 264/313 |
| 4,652,319 | 3/1987 | Hammond | 264/36 |

*Primary Examiner*—James Lowe
*Assistant Examiner*—Jeremiah F. Durkin, II
*Attorney, Agent, or Firm*—Delbert J. Barnard

[57] ABSTRACT

Uncured elastomeric sheet material (42) is built up on the outer surface of a production article (36) constructed from composite materials. A vacuum bag system (20, 24, 26, 30, 32) is used for holding the uncured elastomer member (60) against the composite article (36) while the elastomer member (60) is being cured under heat and pressure. Such curing causes the elastomer member (60) to shrink. The elastomer member (60) is then resized by cutting it into sections (66). The sections (66) are placed back on the composite article (36) and each is positioned on such article (36) at a location best conforming to it in shape. This leaves gaps (68) between the sections (66). Additional uncured elastomer (70) is applied to fill the gaps (68) and bridge across the gaps (68), to in that manner splice the sections (66) together. A vacuum bag (20, 24, 26, 30, 32) is again applied and the bag assembly (20, 24, 26, 30, 32) is again cured under heat and pressure, to cure the additional elastomer material (70). The elastomer member (60'') formed in this manner substantially conforms in size and shape to the production composite article (36) and can be used as a pressure pad in the manufacture of additional articles (36) of the composite material.

10 Claims, 5 Drawing Sheets

METHOD OF MANUFACTURING A CONTOURED ELASTOMERIC PAD

TECHNICAL FIELD

This invention relates to elastomeric pressure pads of a type used between a vacuum bag and a composite part, in process of being manufactured, on a forming tool. More particularly, the invention relates to a method of manufacturing such elastomeric pressure pads, or other contoured elastomeric members, and to products of the method.

BACKGROUND ART

A "composite" is a material composed of thermoplastic resin and reinforcing fibers, e.g. graphite or glass fibers.

It is known to manufacture articles from a composite by molding the composite on a forming tool. For example, a resin impregnated graphite or glass cloth is applied in layers onto a forming tool. Then, a vacuum bag is applied over the composite and the forming tool and the bag is evacuated so that atmospheric pressure will push the bag into pressure exerting contact with the composite.

The vacuum bag material is flat and when the vacuum is applied it becomes wrinkled as it tends to take the shape of the forming tool. If the bagging material were allowed to directly contact the composite material, or to be separated from the composite material by only a release film and breather material, there would be a resin build-up in the voids of the wrinkles. This would necessitate substantial machining of the cured composite article in order to provide it with a suitable finished surface.

It is known to substantially prevent wrinkling by positioning a pressure pad against the uncurved composite article, between it and the vacuum bag. The pressure pad is constructed to have an inner surface which substantially conforms in size and shape to the composite part being manufactured.

The pressure pads are themselves molded on a form. A suitable uncured, heat curable elastomer is applied to the form, so as to cover the form to a desired pad thickness. Then, a vacuum bag is applied to hold the uncured elastomer tight against the forming tool. Then the forming tool/elastomer assembly is placed into a chamber and the chamber is subjected to heat and pressure for curing the elastomeric member.

A problem with heat curing elastomers is that the curing process causes them to shrink. Although minimum shrinkage elastomers have been developed, none have totally eliminated the shrinkage problem. Because of the shrinkage, it has been the practice to construct a forming tool for the pads that is oversized to such an extent that an elastomeric pad made on it will, following shrinkage, be approximately the right size. A problem of manufacturing pressure pads in this matter is that the forming tool used for making the pressure pad is expensive. Such a forming tool must be made for each part and the forming tools must be stored somewhere between periods of use.

The present invention provides a way of manufacturing pressure pads without the need to manufacture special forming tools.

DESCRIPTION OF THE INVENTION

According to the invention, a previously manufactured composite part or article of the desired size and contour is used as a form for manufacturing the elastomeric pressure pad. An uncured, heat curable elastomer is applied to the part, to form on the part an uncured elastomeric member of desired thickness. The elastomeric member is heat cured while it is still on the part. As previously mentioned, the heat curing causes the elastomeric member to shrink so that it no longer conforms in size and shape to the part.

According to the invention, the elastic member is resized, to correct for the shrinkage caused by the heat curing, in the following manner.

The cured elastomeric member is cut into sections. The individual sections are then positioned on the part, each on a region of the part to which it substantially conforms in size and shape. Then, additional uncured elastomeric material is applied to fill the gaps between the sections and to splice the sections together. Following a filling of the gaps and a complete splicing of the sections together, the additional uncured elastomeric material is heat cured while the elastomeric member is retained on the part. This heat curing unifies the elastomeric member and substantially conforms its inner surface to the contour of the part. This enables the member to be used as a pressure pad in the manufacture of additional parts of the same size and shape.

In preferred form, the heat curable elastomer is obtained in sheet form. Pieces are cut from the sheet and are applied to the part to cover the part. The pieces of sheet elastomer are pressed tightly to the part surface to remove all entrapped air. Adjoining pieces are joined by simply overlapping the pieces to form lap joints.

In preferred form, the previously manufactured composite part that is used as the forming tool is a part which has not yet been trimmed to its final net trimmed dimensions, but which has been trimmed to include a border portion. During the manufacture of the pressure pad some of the uncured elastomer is applied to the border portion, so that the pressure pad will have a subtantially corresponding border portion.

Other more specific features of the invention are hereinafter described in the description of the best mode of the invention.

BRIEF DESCRIPTION OF THE DRAWINGS

Like reference numerals are used to designate like parts throughout the several views of the drawing, and.

BEST MODE FOR CARRYING OUT THE INVENTION

Figure 1:
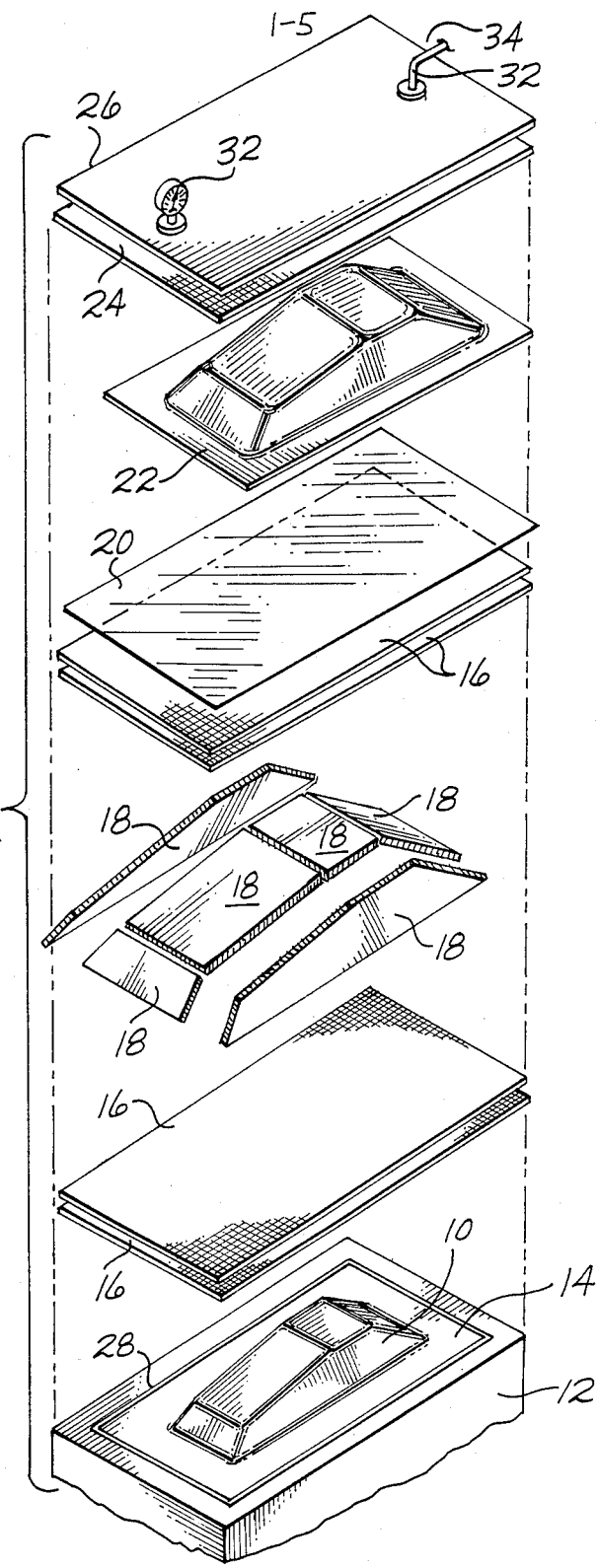
FIG. 1 is an exploded isometric view of typical tooling and materials used for manufacturing a contoured part from composite materials.
Figure 2:
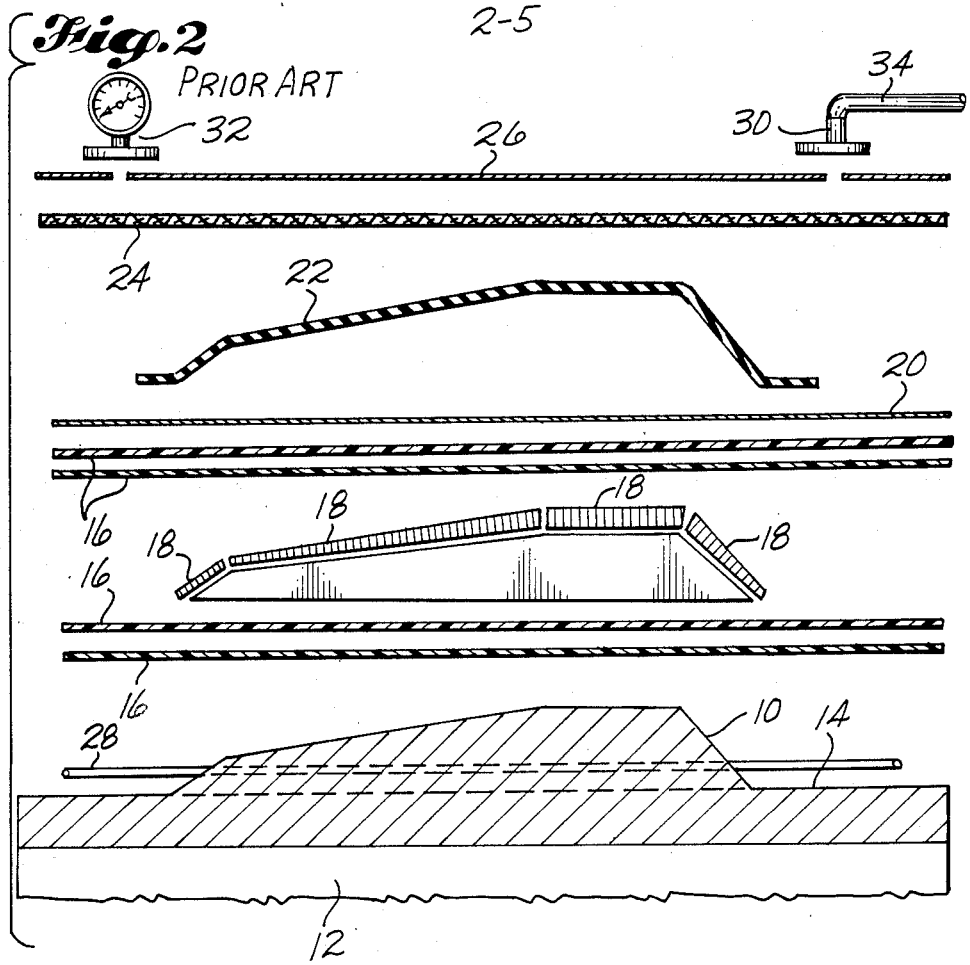
FIG. 2 is an exploded sectional view of the tools and materials shown by FIG. 1.
Figure 3:
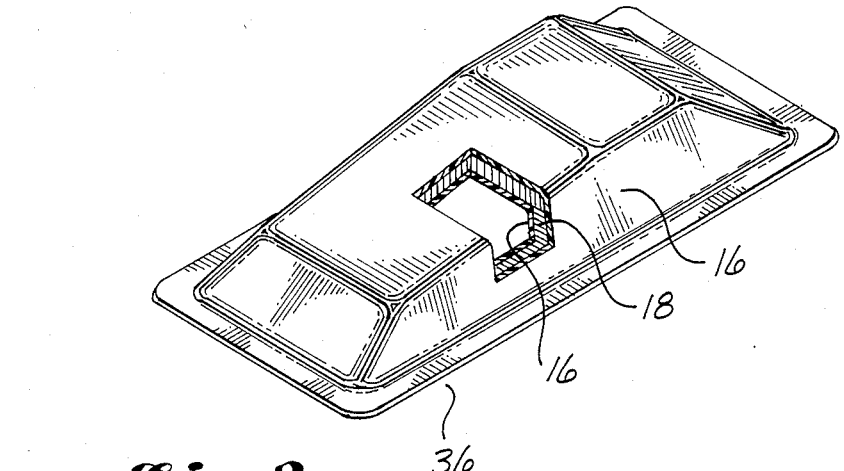
FIG. 3 is an isometric view of a composite part manufactured by use of the tools and materials illustrated by FIGS. 1 and 2, with central portion of the part broken away to better illustrate the make up of the part.

Referring to FIGS. 1 and 2, contoured composite parts are manufactured in the following manner:

A forming tool 10 is provided on a supporting base 12. The base 12 has an upper surface 14 which surrounds the tool 10.

By way of typical and therefore nonlimitive example, the tool 10 may decrease in size as it extends upwardly from the surface 14 to its top and be somewhat rounded at its ends and its top. The particular shape of the tool is not a part of the invention.

Firstly, a suitable parting agent, e.g. a pastewax, is applied to the forming tool 10 and to the surface 14 surrounding the forming tool. Then, a first layer 16 of a resin preimpregnated cloth (e.g. graphite or fiberglass cloth) is placed on the tool 10 and hand and/or tool pressed into tight contact with the surface of the tool 10, with its fibers oriented in a predetermined direction. Then, additional layers 16 of the same material are applied on the tool 10 in the same manner. The direction of orientation of the fibers may change from each layer to the next.

The article being formed may include core pieces 18 constructed from honeycomb material or some other suitable core material. These core pieces 18 are positioned on a layer of the sheet material 16 and then additional layers of the sheet material 16 are placed over them, so that the core pieces are sandwiched between two regions of sheet material 16. The application of the layers of resin preimpregnated sheet material continues until the part has been built up to the desired thickness. Then, a thin TEFLON TM film 20, or the like, is placed over the composite material. Next, a pressure pad 22 is placed over the film. The film 20 keeps the pressure pad from sticking to the composite material. Next, a sheet of breather material 24 is applied over the pad 22. This may be a sheet of dry fiberglass. Then, a sheet 26 of bagging material is applied over the assembly.

A bead 28 of vacuum seal material is applied to the surface 14 around the tool 10. The bagging sheet 26 is pressed against the composite material on the tool 10 and is pleated where necessary to make it closely conform to the shape of the tool 10. A border portion of the bagging material 26 is then pushed down against the sealing material 28. The sealing material 28 is like a putty. It sticks to the surface 14 and the bagging material 26 sticks to it.

A vacuum probe 30 is connected to the bagging material 26 at a location between the tool 10 and the seal strip 28. A vacuum gage 32 is attached to the bagging material 26 at a location spaced from the vacuum probe 30 which is also located between the tool 10 and the sealing material 28. A hose 34 is attached to the vacuum probe 32. The opposite end of the hose 34 is connected to a vacuum pump (not shown). The pump is turned on to pump all of the air out of the space between the bagging material 26 and the tool 10 and surface 14, within the confines of the sealing material 28. This evacuation of the space between the bagging material 26 and the tool 10 and the surface 14 causes air pressure to push inwardly against the bagging material 26, forcing it against the composite material 16 on the tool 10.

Next, the base 12 is moved into a chamber (not shown). In the chamber heat and pressure are applied. The pressure presses the composite material 16, 18 tight against the tool 10 and the heat cures the resin.

Following curing the base 12 is removed from the chamber. The bagging material 26 is then pulled away from the sealing material 28 and is removed from the composite material. The breathing layer 24 is removed and then the pressure pad 22 and the release film 20 are removed. Next, the composite part or article 36 is removed from the tool 10 and is trimmed and dressed.

The above procedure is a known procedure and is not per se a part of the present invention. It has been described for the reason of clearly explaining the purpose and use of the pressure pad 22.

The following is a description of a preferred method of manufacturing a pressure pad 22, by use of the present invention.

An untrimmed production part or article 36 is obtained. This may be a part that has been rejected because of appearance, but has the proper dimensions. There can be no core damage to the article as core damage might result in a crushing of the core during subsequent steps of the method. The article 36 must be of acceptable quality after some repair work on it. The article 36 is trimmed to provide a border flange 38 of about one half inch to about one inch in width. The article 36 is then sanded to remove ridges and wrinkles. A suitable filler material is applied to outside surface imperfections and such material is sanded to provide a smooth surface. The outside surface of the article 36 is sanded until the article 36 is faired and smooth. The filling and sanding is repeated as necessary until the article 36 is properly dimensioned and is free of all surface imperfections.

Next, the article 36 is placed on a support base 40 that is essentially like the base 12 for the tool 10. Then, two coats of a parting agent is applied to the article 36. By way of example, a suitable paste wax can be applied to some surfaces. If used, the wax is buffed to a high gloss. A liquid detergent solution may be a good parting agent for some surfaces. FREECOAT TM 700 is a good parting agent for use on an article constructed from a graphite fiber reinforced composite material.

Next, enough uncured elastomer 42 is obtained to complete the layup. By way of example, the elastomer may be an uncured silicon rubber sheet stock which is stored in cold storage until needed.

Figure 4:
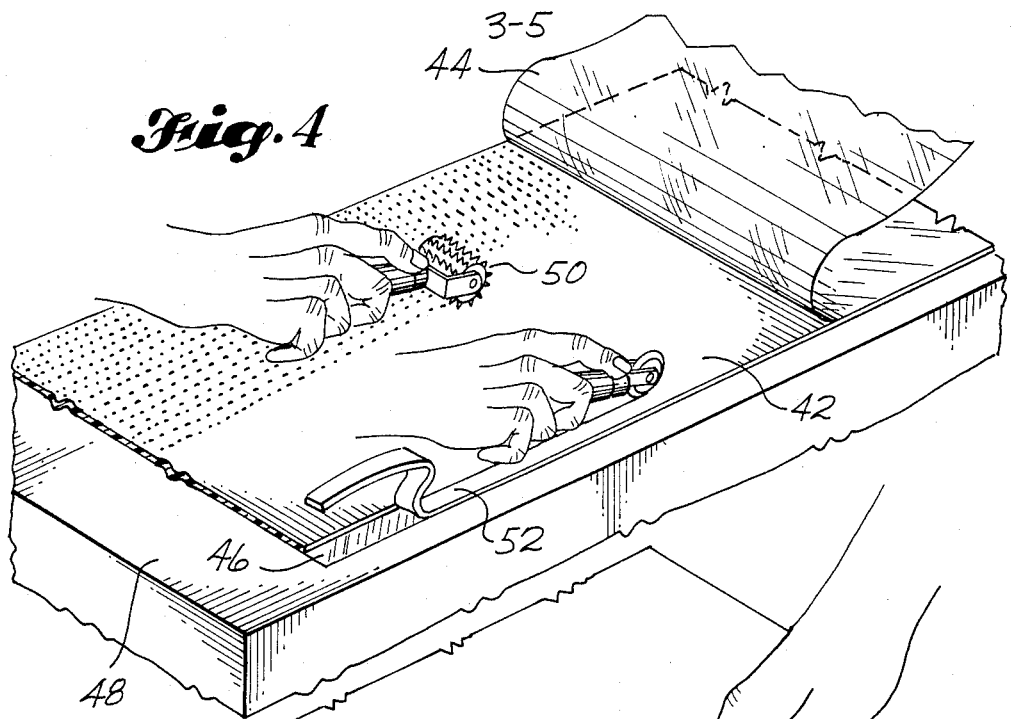
FIG. 4 is an isometric view of an uncured elastomer in sheet form, showing a protective sheet on one side pulled away from the uncured elastomer, and showing a tool being used for perforating the uncured elastomer, and further showing a second tool being used for cutting the uncured elastomer into strips.
Figure 5:
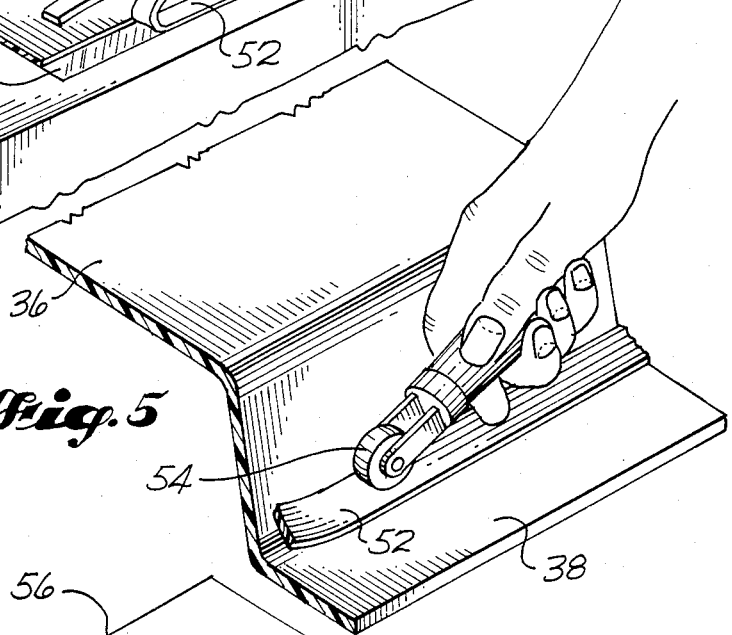
FIG. 5 is a fragmentary isometric view showing a strip of the uncured elastomer being pressed into a concave inside corner of a composite part which is being used as a forming tool.
Figure 6:
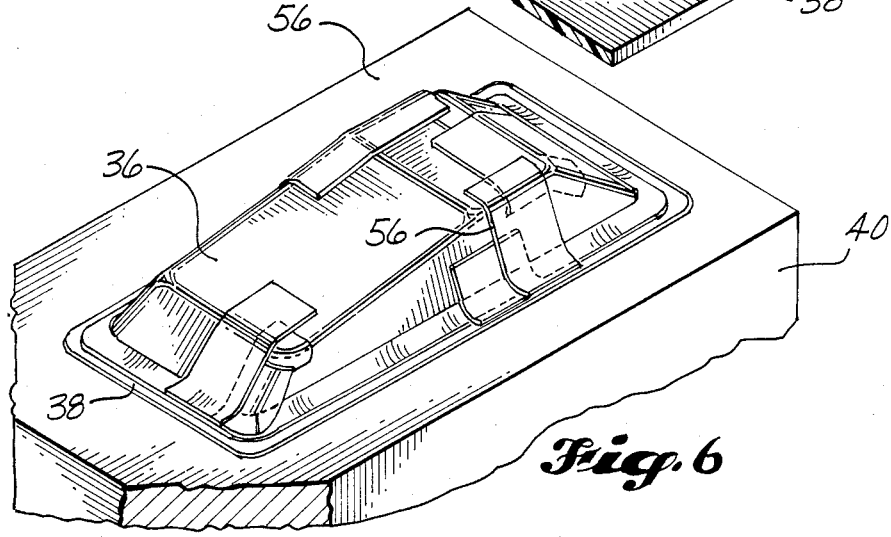
FIG. 6 is an isometric view of the composite part and a support base for the composite part, such view showing pieces of the uncured elastomer in the process of being applied to the composite part.
Figure 7:
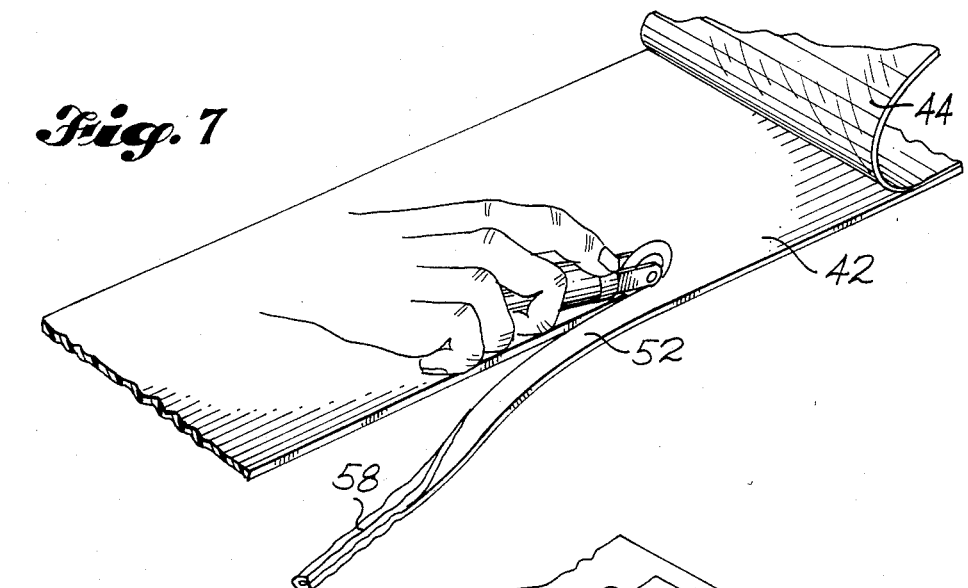
FIG. 7 is an isometric view showing a strip being cut from a sheet of uncured elastomer, and showing a portion of the strip rolled to form a bead.
Figure 8:
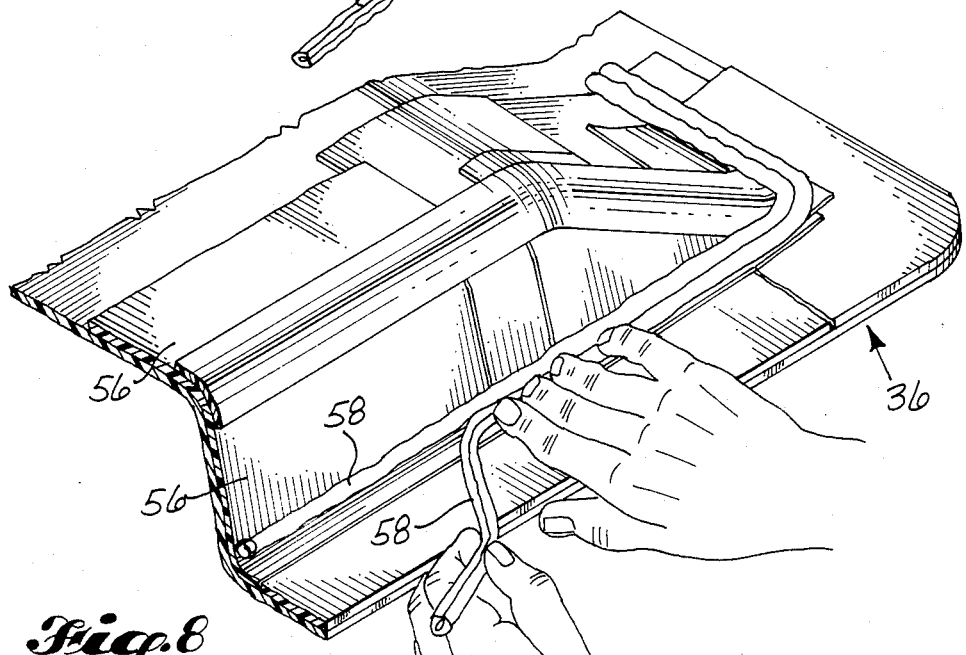
FIG. 8 is a fragmentary isometric view showing beads of the uncured elastomer being applied to concave inside corner regions of the composite part.
Figure 9:
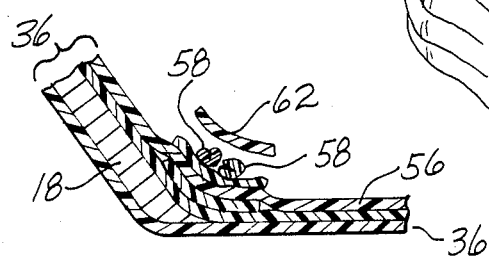
FIG. 9 is a fragmentary sectional view taken through a concave inside corner portion of the composite part, and showing a typical use of uncured elastomer for building up an inside corner region of an elastomeric member being formed on the composite part.

The uncured sheet elastomer 42 comes sandwiched between two polyethylene sheets 44, 46. This sheet material is layed out flat on a clean suitable surface, e.g. a rubber padded table 48 (FIG. 4). The top polyethylene sheet 44 is pulled away from the sheet 42 of uncured elastomer and the uncured elastomer 42 is slightly perforated, such as by use of a common porcupine roller 50. Care must be taken to not force the points of the porcupine roller 50 too deeply through the uncured elastomer sheet 42. Small perforations are all that is required. Large perforations will not readily close during the cure of the elastomer. The small holes are provided to serve as avenues for air escape from the space between the elastomer and the article 36, as will hereinafter be described in greater detail.

Firstly, strips 52 of the uncured elastomer are cut from the sheet stock 42. These strips 52 should be about one inch to about two inches in width. The strips 52 are pressed into the radii between the exterior surface of the article 36 and the top surface of the border flange 38. Similar strips 52 are also pressed into any other inside corners formed in the article 36. A round faced roller 54 may be used for pressing the strip material 52 into the concave regions.

Next, a layer 56 of the uncured elastomer is applied over the entire article 36, including over the border 38 of the article 36 and the strips 52 that were applied to the concave inside corner regions. The uncured elastomer sheet 42 is cut and spliced as necessary to cover the entire surface of the article 36. Each piece 56 of the sheet elastomer is pressed tightly to the surface of the article 36, so that all entrapped air will be removed. Adjoining pieces 56 are joined or connected by simply overlapping the material.

Preferably, some additional strips 52 are cut from the sheet elastomer 42, measuring about two inches to about four inches in width. These strips are rolled into "noodles" 58. One or two of these noodles are pressed into the concave corner regions, over the sheet material 42. Preferably also, additional strips 52, which may measure about two inches in width, are cut from the sheet material 42 and are applied over the noodles 58 in the inside corners. The elastomer is then pressed into place in the inside corners, primarily by use of one's fingers. A flat roller (not shown) may then be used over the member 60 that has been formed by the uncured elastomer in order to give such member an even, contoured appearance. Additional reinforcing layers 62 of the uncured elastomer are applied to the outside edges of the member 60 and to other areas of the member as required by tool design.

Next, a film of parting material 20 is positioned over the uncured elastomer member 60. Then, a breathing sheet 24 (e.g. fiberglass sheet) is applied and a nylon film (i.e. bagging material 24) is positioned over the breathing sheet 24.

A bead 28 of sealing material is placed on the upper surface of the base 64. As in the method of constructing the article from composite material, the bagging film 26 is pressed tightly against the uncured elastomer member 60 and is then pressed into the bead of sealing material 60. Then, a vacuum is applied to the space between the bagging film 26 and the uncured elastomer member 60, to cause atomspheric pressure to press inwardly against the bagging film 26 and force it tightly against the uncured elastomer member 60.

Following bagging, the base 40 is moved into a curing chamber (not shown) and in such chamber the assembly is subjected to heat and pressure. For example, when silicon rubber is used, the elastomer member will typically be cured at 250° Farenheit, and under 45 psig, for ninety minutes.

Following the cure, the assembly is removed from the chamber. The cured elastomer member 60' is removed from the article 36. It is then wrapped in a fiberglass cloth (not shown) to keep surface portions from contacting. It is then postcured in this wrapped condition in an air circulating oven. When silicon rubber is used, the postcure will typically be at 400° Farenheit for four hours.

The above-described procedure will produce a cured elastomer member 36 which has shrunk in size. When silicon rubber is used, the shrinkage is about 3.5% to about 4%. The following are the steps taken, in accordance with the invention, for resizing the elastomer member 60' to make it substantially conform in size and shape to the article 36.

Firstly, the elastomer member 60' is cut into a plurality of sections 66. The cuts 68 are made at the location which best preserves the original contours and which allow splices to be made in the straightest and flattest areas.

Next, the sections 66 of the elastomer member are placed back on the article 36, each in a position best conforming to its shape. This results in the sections 66 being spaced apart somewhat and in the gaps 68 between sections 66 collectively representing the amount of shrinkage which occured during the curing.

Next, the pad sections 66 are held in place on the tool 66 and strips 70 of uncured sheet elastomer are applied to fill the gaps 68 between sections 66 and splice together adjoining sections 66.

The strips 70 of sheet material should be cut at a width which will allow an overlap of at least one half inch on each section 66. The uncured elastomer is pushed into the gaps 68. Additional uncured elastomer 70 is applied over the gaps 68 and in the internal corners and at the other build-up areas, as necessary to provide a thickness at the gap regions which is substantially equal to the thickness on opposite sides of the gap regions. As before, the uncured sheet elastomer used to fill the gaps, to build-up the areas requiring additional thickness, and to bridge over the gaps 68 and splice together the sections 66 of the cured elastomer member 60', should be perforated. When being applied the uncured elastomer 70 is pressed in place to force out air and prevent voids.

Figure 10:
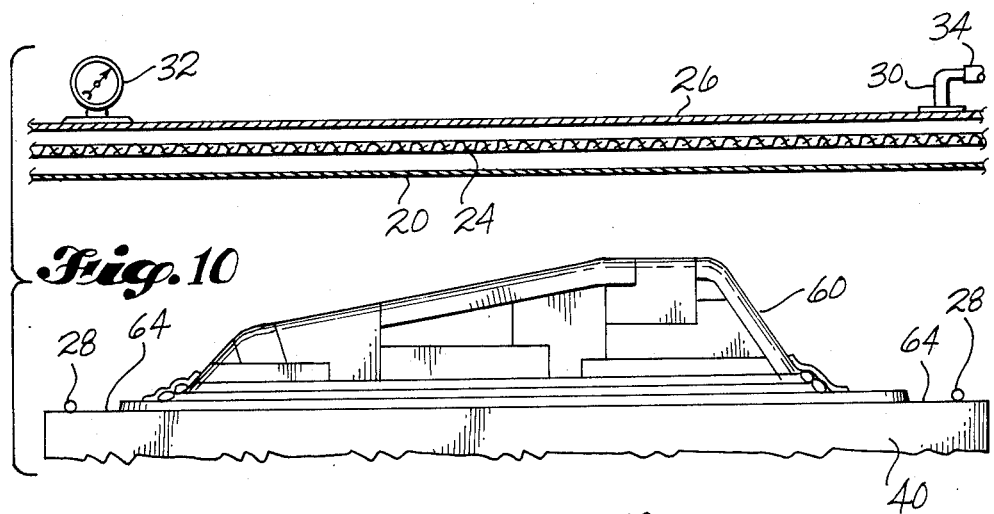
FIG. 10 is a side elevational view of the composite part after it has been covered with the uncured elastomer, and showing a parting sheet, a breathing sheet and a bagging film spaced above the covered composite part and its support base.
Figure 11:
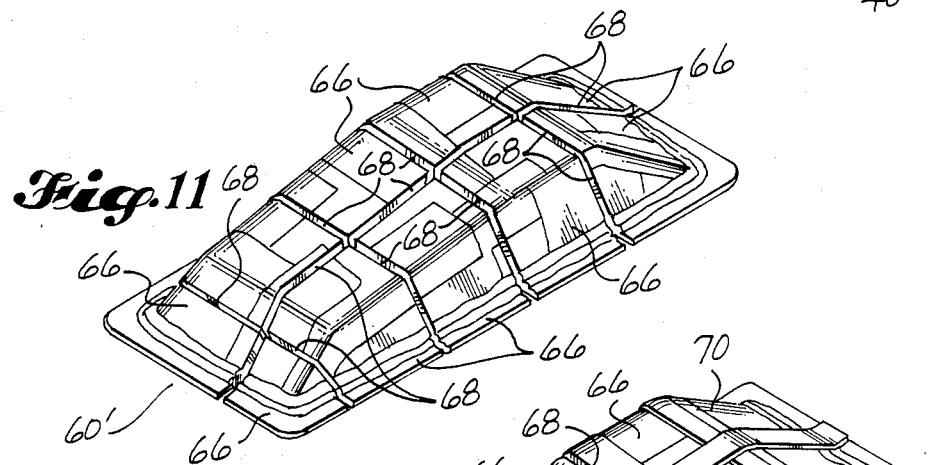
FIG. 11 is an isometric view of an elastomeric member that was formed on and by the composite part, serving as a forming tool, such view showing the elastomeric member after it has been heat cured, and showing such member being cut up into a plurality of sections.
Figure 12:
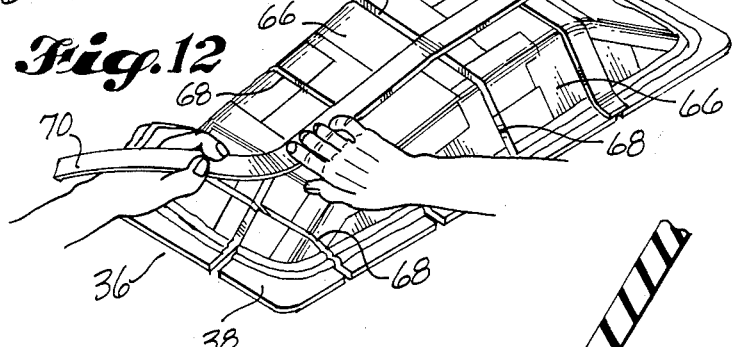
FIG. 12 is an isometric view showing the sections of the elastomeric member placed back on the composite part, each on a region of the composite part corresponding to it in size and shape, such view showing strips of uncured elastomer being applied to fill the gap between adjacent sections and to splice together the adjacent sections.
Figure 13:
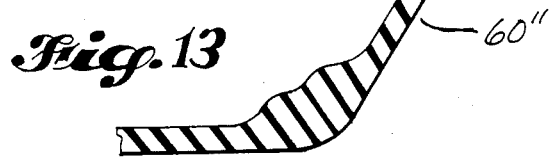
FIG. 13 is an enlarged scale sectional view taken through an inside corner region of the elastomeric member, following its final cure, such view showing the smooth nature of the inside surface of the elastomer member.

Next, a parting film 20, and then a fiberglass breathing layer 24, and then a nylon bagging film 26 are applied, as before (FIG. 10). The bagging film 26 is secured to the base and is molded to the elastomer member 60', as vacuum is being applied. Then the resized assembly 60" is placed back into the chamber and cured under heat and pressure, e.g. 250° Farenheit and 45 psig for ninety minutes, when silicon rubber is used. Following curing, the elastomer member is again wrapped in fiberglass cloth and placed in an air circulating oven for a post cure. As before, the post cure may be for about four hours at 400° Farenheit.

Following the post cure, the elastomer member 60" is removed from the oven and allowed to cool. The inside surface 72 of the member 60" is closely examined. Any small voids or incomplete splices which are found are filled with an air drying patch material. When silicon rubber is being used, the patch material may be an air drying silicon patch material. Following patching of the voids or incomplete splices, the member is allowed to cure for twenty-four hours in an area free of dust and debris.

The elastomer member 60" which has been formed may have to be trimmed somewhat to size but is otherwise ready to be used as a pressure pad in the manufacture of articles from composite materials, in the manner described above. Its inner surface is smooth and even.

After the pressure pad has been used for awhile, it can be cleaned by use of a solvent. Small cuts, tears or voids found in the part-side surface of the pad can be repaired by use of the aforementioned air drying silicon patch material. A putty knife can be used to apply the material and provide a smooth surface. Following application, the pad is allowed to air cure for about twenty-four hours in a dust free area. Larger cuts, tears, etc. can be prepared in the following manner. The damaged area is cut out. Then, the pad 60" is placed over a production article 36 to which a parting agent has first been applied. Then, additional pieces of uncured elastomer are applied to fill in the cut out area and splice the new patch material to the pad on opposite sides of the cut out. Then, the patch material is cured and then post-cured in the manner previously described.

As clearly demonstrated, the practice of the present invention produces a properly sized pressure pad without the need to manufacture a special forming tool for use in making the pressure pad. Thus, the initial cost of a special forming tool, which is substantial, and the cost of storing such a tool between uses, are saved by a practice of the invention.

After a production part 36 has been used as a forming tool for a pressure pad, it can be trimmed to a proper net size and then be put into use. Thereafter, if another pressure pad needs to be constructed, another production part or article 36 can be prepared, in the manner described above, and used as a forming tool.

The uncured elastomer may be uncured silicon rubber "B" staged, calendered sheet stock, of a thickness of about 0.0625 inches. This rubber shall not contain any iron oxides and must be capable of remaining at room temperature for a minimum time of thirty days without losing any physical properties after cure. A material of this type is available from Mosites Rubber Company, Inc., P.0., 2115, Fortworth, Tex. 76113. This company identifies the material as "Type No. 1453." Such material is also available from D Aircraft Products Co. of 1191 Hawk Circle, Anaheim, Calif. 92807. This company identifies the material as "Type No. SMC650."

A single component, air curing, elastomeric adhesive, to make minor repairs and fill small voids (i.e. patch material), is available from Minco Products, Inc. of 7300 Commerce Lane, Minneapolis, Minn. 55432. It is identified by this company as "MINCO No. 6 Rubber Adhesive." This material can be obtained from D Aircraft Products Co. of 1191 Hawk Circle, Anaheim, Calif. 98027. This company identifies it as "DAPCOTAC No. 3380 Silicon Rubber Adhesive."

The following are suitable parting agents: (1) any household liquid detergent mixed with water in the amounts of 25% detergent and 75% clean water by volume; (2) a commercially available polish, e.g., JOHNSONS TM Pastewax; and (3) FREECOAT 700 TM.

A suitable faring compound, for filling surface imperfections in a composite part that is to be used as a forming tool for the pressure pad, is a cold HPA material listed in M4103-1, of the Boeing Company Resin & Plastics Tooling Materials Usage Chart.

The following are suitable bagging materials. The bag itself may be made from a nylon film about 0.002 inch thick. The breather material may be a glass fabric, type 181 or 1581 Greige Goods, or it may be a 949 Nylon Taffeta Fabric Breather, Greige Goods only (which may be obtained from Ferro Corporation of Culver City, Calif.). The vacuum seal strip is a well-known material for this purpose. It comes in strips measuring about ⅜ths by ⅛th inch. It can be obtained from Schnee-Morehead Chemicals of 11 North Nursery Road, Irving, Tex.

The uncured elastomer stock should be stored at a temperature of 50° Farenheit or less. The faring compound should be stored in a refrigerated storage. No special storage is required for the other materials.

The lay-up of the uncured elastomer member should be done in a clean area to avoid contamination of the uncured elastomer by metal chips, wood chips, paint, etc.

The present invention was made while trying to develop an inexpensive way of manufacturing a pressure pad for use in the manufacture of parts or articles from composite materials. The invention includes both the method of manufacturing the elastomeric pad and the product of the method. It is believed that this method can also be used for manufacturing other types of contoured elastomeric members. Accordingly, the invention also includes a method of making contoured elastomeric members in general, and the products of such method.

The examples which have been illustrated and described constitute the best mode of the invention and enabling examples of the invention. However, such examples are not to be used for defining or limiting the invention. Instead, the invention is to be defined by the following claims interpreted in accordance with established principles of patent claim interpretation, including use of the doctrine of equivalents.

What is claimed is:

1. A method of manufacturing a contoured pressure pad of a type used for applying pressure to a contoured composite part during curing of said part, comprising:

providing a previously manufactured composite part of the desired size and contour, to serve as a form for the pressure pad;

applying uncured, heat curable elastomer to said part, to form on said part an uncured elastomeric member of desired thickness;

heat curing said elastomeric member while it is on said part; and resizing the elastomeric member to correct for shrinkage caused by the heat curing, comprising:

cutting the cured elastomeric member into sections;
positioning the sections on the part, each on a region of the part to which it substantially conforms in size and shape;
applying additional uncured elastomeric material to fill gaps between the sections and splicing the sections together; and
heat curing the additional uncured elastomeric material while the elastomeric member is on the part, to unify the elastomeric member and substantially conform its inner surface to the contour of the part, enabling the member to be used as a pressure pad in the manufacture of additional parts of the same size and shape.

2. The method of claim 1, comprising obtaining the uncured, heat curable elastomer in sheet form, cutting pieces from said sheet elastomer and applying the pieces to the part to cover the part, including pressing the elastomer tightly to the part surface to remove all entrapped air, and joining the pieces by overlapping the pieces.

3. The method of claim 1, comprising using a previously manufactured composite part which has not yet been trimmed to its final net trimmed dimensions, and which includes a border portion, and during the manufacture of the pressure pad applying the elastomer to said border portion, so that the pressure pad will have a substantially corresponding border portion.

4. The method of claim 1, comprising perforating the uncured, heat curable elastomer, providing a vacuum bag over the uncured elastomeric member and sealing it about said member and the part on which the member is formed, and evacuating the region between the bag and the part, to cause atmospheric pressure to push the bag into pressure applying engagement with the uncured elastomeric member, and then placing the bagged assembly into a chamber and subjecting it to heat and pressure within said chamber for curing the uncured elastomeric member.

5. The method of claim 1, comprising removing the elastomeric member from the part following curing, and filling any voids or incomplete splices on the side of the member which was against the part with an elastomeric filler material.

6. The method of claim 1, comprising using a previously manufactured composite part which has not yet been trimmed to its final net trimmed dimensions, and which includes a border portion, and obtaining the uncured, heat curable elastomer in sheet form, cutting pieces from said sheet elastomer and applying the pieces to the part to cover the part, including its said border portion, and including pressing the elastomer tightly to the part surface to remove all entrapped air, and joining the pieces by overlapping the pieces.

7. The method of claim 6, comprising perforating the uncured, heat curable elastomer, providing a vacuum bag over the uncured elastomeric member and sealing it about said member and the part on which the member is formed, and evacuating the region between the bag and the part, to cause atmospheric pressure to push the bag into pressure applying engagement with the uncured elastomeric member, and then placing the bagged assembly into a chamber and subjecting it to heat and pressure within said chamber for curing the uncured elastomeric member.

8. A method of manufacturing a contoured elastomeric pad, comprising:
providing a form having a contoured forming surface;
applying uncured, heat curable elastomer to said form, to form on said form an uncured elastomeric member of desired thickness;
heat curing said elastomeric member while it is on said form; and
resizing the elastomeric member to correct for shrinkage caused by the heat curing, comprising:
cutting the cured elastomeric member into sections;
positioning the sections on the form, each on a region of the form to which it substantially conforms in size and shape;
applying additional uncured elastomeric material to fill gaps between the sections and splicing the sections together; and
heat curing the additional uncured elastomeric material while the elastomeric member is on the form, to unify the elastomeric member and substantially conform its inner surface to the contour of the form.

9. The method of claim 8, comprising obtaining the uncured, heat curable elastomer in sheet form, cutting pieces from said sheet elastomer and applying the pieces to the form to cover the form, including pressing the elastomer tightly to the form surface to remove all entrapped air, and joining the pieces by overlapping the pieces.

10. The method of claim 3, comprising perforating the uncured, heat curable elastomer, providing a vacuum bag over the uncured elastomeric member and sealing it about said member and the form on which the member is formed, and evacuating the region between the bag and the form, to cause atmospheric pressure to push the bag into pressure applying engagement with the uncured elastomeric member, and then placing the bagged assembly into a chamber and subjecting it to heat and pressure within said chamber for curing the uncured elastomeric member.

* * * * *